Feb. 22, 1966

E. W. YOUNG 3,237,171

TIMING DEVICE

Filed July 18, 1962

INVENTOR
EDWARD W. YOUNG

BY Paris, Haskell and Levine

ATTORNEYS

United States Patent Office 3,237,171
Patented Feb. 22, 1966

3,237,171
TIMING DEVICE
Edward W. Young, Trevose, Pa., assignor, by mesne assignments, to United Aircraft Corporation, a corporation of Delaware Filed July 18, 1962, Ser. No. 210,691
15 Claims. (Cl. 340—172.5)

Figures 1, 2:
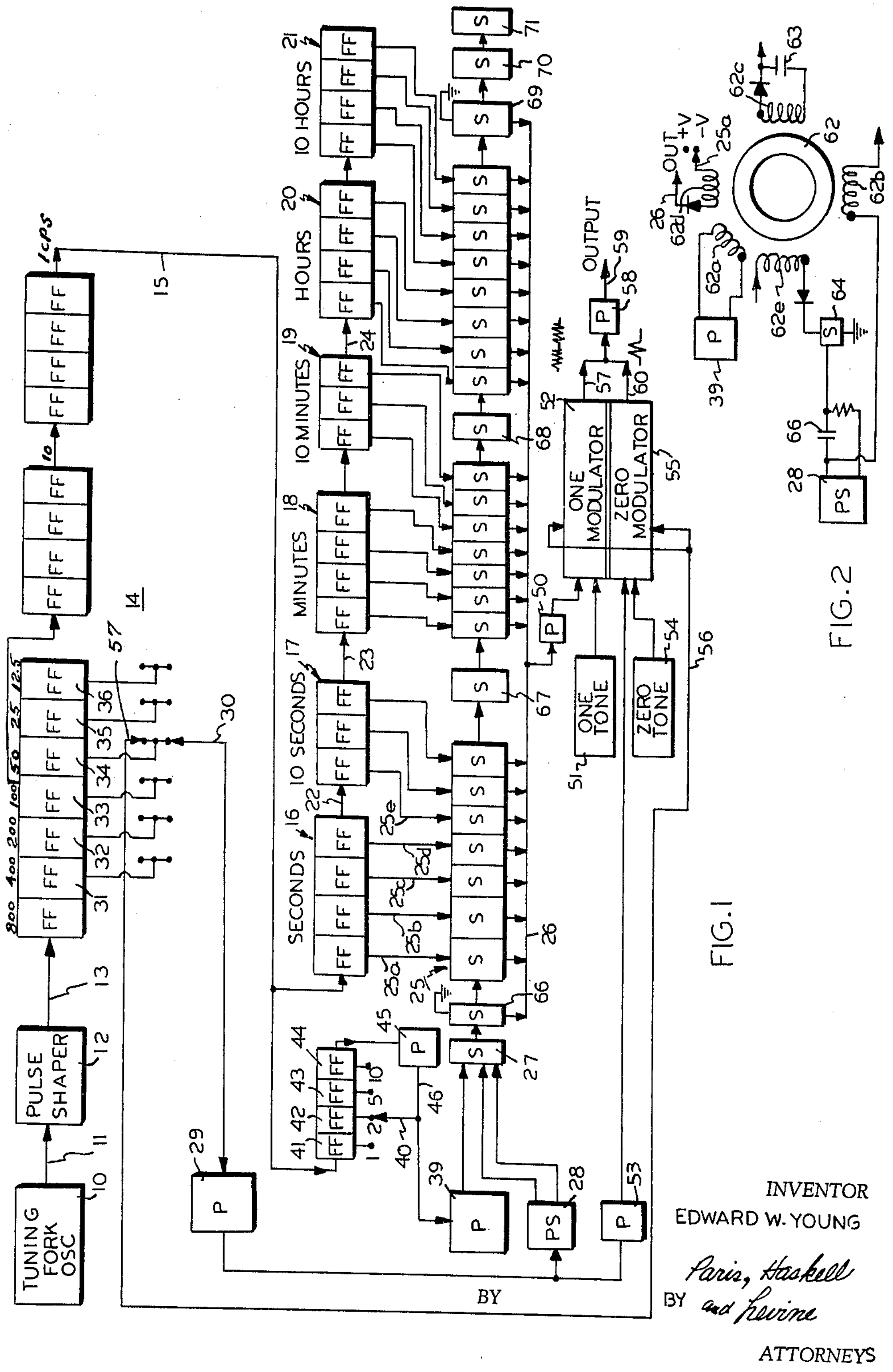

This invention generally relates to an electronic clock and more particularly to an electronic clock for producing a different serial code of impulses for each different time of day, which pulses represent the time of day in either the binary or other desired code number systems.

Time code clock generators of this type are oftentimes required where data is being continuously recorded so that the time-of-day may also be recorded alongside of the data on the recording medium for the purpose of later interpreting this data.

For example, in flight testing an aircraft or missile, a continuous recording of the craft's performance is usually made together with a simultaneous recording of the time of day alongside of the performance data on the record. With this recorded time as a reference, the performance of the craft during any given time interval or at a given time instant during the flight can later be determined by merely scanning the time code on the recording until reaching the time desired and then reading out the performance data that has been recorded at that time. Similarly, in performing various other automatic control functions or testing functions, such as automatically programming a machine to perform different functions at different times of the day, a recording of the instructions for the machine together with a recording of the time-of-day when these instructions are to be carried out, are generally made side-by-side on a record. For automatically programming the machine, a readout mechanism responds to both the time code and to the instructions to insure that each of the operations or instructions is performed at the correct time.

In the past, time code pulse generators for performing this function have been unusually complex mechanisms and it is accordingly a principal object of the present invention to provide a time code pulse generator that is considerably less complex and possessed of fewer components than the equipments heretofore available.

It is a further object of the invention to provide such a clock that is comprised of miniature electronic and magnetic components, and preferably comprised exclusively of solid state components, such as transistors and miniature saturable cores.

Another object of the invention is to provide such a solid state time pulse generator that can be packaged within a smaller volume, and is lighter in weight than the prior devices.

Still another object of the invention is to provide such a miniature generator having low power requirements and accordingly may be battery powered and made portable for many applications.

A still further object is to provide a time-of-day pulse generator in which the time of day is automatically readout each second, or in other regular time sequence, and in which the time interval during readout of pulse may be adjusted over a wide range.

A still further object is to provide such a time code generator in which the time interval of readout of the sequential pulse code may be varied to readout the pulse code more rapidly or more slowly as may be desired for the application intended.

Other objects and many additional advantages will be more readily understood by those skilled in the art after a detailed consideration of the following specification taken with the accompanying drawings wherein:

FIG. 1 is a block diagram representing one preferred time code generator system according to the invention, and FIG. 2 is an electrical schematic diagram, illustrating details of one preferred magnetic readout register for the generator that may be employed in the system of FIG. 1.

Referring now to the drawings, there is shown in FIG. 1 a time-of-day pulse generator system according to the present invention wherein the generator changes its output code of pulses for each succeeding second of time. The pulse code is produced in the form of a sequential series of uniform impulses representing the time-of-day in seconds, tens of seconds, minutes, tens of minutes, hours, and tens of hours, all in binary code form.

For accurately measuring the time, there is provided a constant frequency stabilized oscillator 10, preferably a tuning fork oscillator as shown, that functions at a very constant frequency of 1600 cycles per second to provide a uniform series of output impulses at this rate over line 11. These impulses are first directed to a pulse shaper circuit 12 to insure that each of the pulses generated is of uniform waveshape, and thence are directed over line 13 to the input of a multistage frequency divider circuit, generally indicated as 14, and comprised of a plurality of cascaded binary flip-flop stages, or other binary counter stages, being interconnected to successively reduce the frequency of the input signals to seconds of time or other period desired. At the output line 15 leading from the last of such frequency divider stages, there is thus produced a very constant frequency source of pulses operating at one cycle per second or at other selected frequency.

The one-second pulses over line 15 are thence directed to a counter mechanism comprised of a series of cascaded pulse counters 16 to 21, inclusive. The first of these counter units 16 is a scale-of-ten counter, which may be comprised of a group of four cascaded flip-flop stages interconnected in feedback, as known to those skilled in the art, to count up to ten of such pulses before producing an output pulse over line 22 to the next counter 17. The first counter 16, therefore, receives pulses at the rate of one each second and counts up to ten seconds of time before producing an output pulse over line 22 leading to the next counter unit 17.

The second counter 17 is a scale-of-six counter, preferably comprised of three flip-flop stages interconnected in cascade and therefore after receiving six impulses from the first counter 16, the second counter completes its cycle of operations and produces an output pulse over line 23 to the third counter 18.

Thus it is noted that after sixty seconds of time or one minute, a pulse is produced over line 23 leading to the minutes counter 18.

In a similar manner, the minutes counter 18, the tens-of-minutes counter 19, the hours counter 20, and the tens-of-hours counter 21, are cascaded such that after sixty minutes of time have expired, or one hour, an output pulse is produced over line 24 leading from the minutes counter 19 to the hours counter 20, and after each ten hours have expired a pulse is directed to the tens-of-hours counter 21.

As it is believed apparent to those skilled in the art at this point of the specification, the counters as thus far described count time of day in terms of seconds, minutes, and hours. This time-of-day may read out in visible form by merely connecting suitable indicators, such as neon lamps (not shown), to all of the counter units 16, 17, 18, 19, 20, and 21, and observing the binary code of the lighted indicators. The counters 16 to 21, inclusive, also change their count and indication every second of time to provide a different binary code representing each succeeding second of the day.

According to the present invention, it is desired to periodically readout from the counters 16 to 21, inclusive, the stored binary time code as a group of sequentially produced electrical pulses, or in other words, to read out a train of electrical pulses from the counters, with the presence or absence of a pulse at each position in the train being indicative of whether or not a binary digit is or is not present in the code at that position.

To perform this readout function, there is provided a magnetic sampling register generally indicated at 25, and being comprised of a plurality of magnetic stages, each labeled S, with at least one of the register stages S being provided for each stage of the counters 16 to 21, inclusive, to read out the binary one or binary zero condition of that stage of the counter.

Each of the stages S of the magnetic readout register 25 is connected to its associated one of the counter stages by a direct line such as 25*a*, 25*b*, etc., whereby each of these stages is adapted to sample or detect whether or not its associated counter stage is in a binary one or a binary zero condition and to produce an output impulse over a common output line 26 only in the event that its counter stage is in a binary one condition, indicating that a count has been stored therein. The various stages S of the readout register are interconnected in cascade and are adapted to be operated in sequence whereby each of these readout stages operates in sequence to sample its associated counter stage and provide a binary one pulse or zero pulse over output line 26 in a serial array.

For operating these sampling stages 25 in sequence, there is provided a pulse switching device 28, labeled P S in FIG. 1, that successively pulses the first stage 27 of the sampling register at a much greater rate or frequency than the one cycle per second readin of pulses from line 15 to the counters. The rate of operation of the pulse switching unit 28 is sufficiently great so that all of the stages of the sampling register 25 are successively operated in sequence during a time interval less than one second so that the count stored in all of the stages 16 to 21, of the counter mechanism may be read out in the interval before the counter stages change their time code in response to the next second of time.

For controlling the time interval of readout of the stages 25, the pulse switching unit 28 is energized or actuated by a pulsing device 29 at a preselected much higher frequency, than may range from 12.5 cycles per second to 400 cycles per second. The preselected rate of readout is adjustable by the operator by means of a selecting switch 30 which may be connected to any one of the pulse scaler stages 31 to 36, inclusive, of the pulse divider circuit 14. Referring to FIG. 1, it is noted that the stage 31 of the pulse divider unit produces a frequency at the rate of 400 cycles per second, stage 32 produces a frequency at the rate of 200 cycles per second and similary stages 33 to 36, inclusive, produce output pulses at successive submultiples of these frequencies. Thus, if the selecting switch 30 is connected to stage 34 of the pulse scaler and therefore receives pulses at the rate of 50 cycles per second, the pulse switch unit 28 is operated at this rate to successively actuate the magnetic sampling register 25. Each of these switching pulses in succession steps the sampling register 25, to read out its associated stage of the counter mechanism 16 to 21, inclusive, in sequence.

It will be noted that in the system described, there is provided a total of about 30 stages in the sampling register 25, whereby after 30 pulses have been produced by the pulse switching unit 28, the sampling register 25 has completed its cycle of operation and has sampled all of the stages of the counters 16 to 21, inclusive. Since the previously selected sampling rate from stage 30 of the scaler 14 occurs at a speed of 50 cycles per second, the complete readout interval of the counter 25 occupies a period that is only about sixty percent of one second, and consequently the counter 25 is read out before it changes its time code and responds to the next succeeding one cycle per second pulse over line 15. In a similar manner, if the selector switch 30 is connected to the stage 31 of the pulse scaler 14, and thereby is pulsed at a rate of 400 cycles per second, less than one tenth of a second is required to read out all of the stages of the counters 16 to 21, leaving the remaining nine tenths of a second before the next succeeding one cycle per second pulse is entered into the counter stages 16 to 21, inclusive. Thus, the selector switch 30 controls the time interval of readout of the counters 16 to 21, inclusive, and may be varied as desired to read out the pulse code in either a shorter or longer time interval.

In addition to adjustably controlling the time interval of reading out the counters, it is oftentimes desired to control the repetition rate of this readout. For example, it may not be desired in some instances to read out the code after each second of time has expired but in some instances it may be desired to read out the code every two seconds or five seconds or ten seconds, or at some other frequency. For independently controlling this function, there is provided an additional pulser circuit 39 which functions to reset or condition the sampling register 25 for readout operations. The pulse forming circuit 39 is actuated through a second selector switch 40 which, in turn, selects a different frequency scaler circuit, comprising stages 41 to 44, inclusive, thereby to actuate the pulse forming circuit 39 at a controllable rate determined by the position of the selector switch 40. In the illustrated example of FIG. 1, the pulse scaler circuit stages 41 to 44, inclusive, receive energization at the rate of one cycle per second over line 15 whereby the positioning of the selector switch 40 to different ones of these stages selectively produces pulses at a frequency of one pulse every second, or one every two seconds, or one every five seconds, or one every ten seconds as may be desired.

Despite the selected position of the switch 40, it is also usually desired to provide a readout of the clock at least once every ten seconds; and for this purpose, there is provided an additional pulse forming circuit 45 that is connected to the last stage 44 of the latter pulse scaler circuit to produce a pulse over line 46 leading to the reset pulse forming circuit 39 once every ten seconds. As shown, the output of pulse forming circuit 45 is connected in common with the selector switch 40 so that despite the setting of the selector switch 40, a pulse is always produced over this line 48 at the end of every ten seconds.

As indicated above, the reset pulse forming circuit 39 operates to reset the sampling register 25 and thereby condition the register for each readout cycle of operations. Consequently, the sampling register 25 does not commence to sample the counters 16 to 21, inclusive, until receiving actuation from the reset pulse forming circuit 39.

Thus, the reset pulse forming circuit 39 automatically conditions the sampling register 25 at regularly recurring time instants to read out the clock mechanism each second or every two seconds, or every five seconds, or every ten seconds; and once the register 25 is reset, the switching circuit 28 thereupon successively actuates each of the stages thereof to successively sample the counter stages for a controllable time interval determined by the time setting of the selector switch 30, thereby providing independent control of both the time interval that the counters 16 to 21, inclusive, are readout as well as independent control of the time instant that each readout of the clock is commenced.

The binary coded readout pulses being successively produced over line 26 and corresponding to the time-of-day code, are directed from line 26 to a pulse forming circuit 50 that energizes a modulator circuit 52. The modulator circuit 52 is also energized by a tone oscillator 51 which produces a sinusoidal tone frequency representing the number 1, which tone frequency is much higher than the frequency of the readout pulses. The modulator 52 in responding to the pulses and to the tone generator 51 thereby produces coded tone impulses over line 57, being directed to a pulse forming circuit 58 and thence over an output line 59. The reason for coding these output pulses by a higher frequency tone is that the pulses are usually directed to be recorded on a tape or other record member, and it is therefore desired that the pulses be modulated at the higher tone frequency for such recording purposes.

In the absence of a pulse in the code, thereby signifying a zero in the binary number, there is provided a pulse forming circuit 53 and a second tone generator 54 which together energize a zero signal modulator 55 to produce zero tone pulses over output line 60, whenever a zero signal is to appear in the binary code. The pulse forming circuit 53 is actuated by the pulse forming circuit 29 mentioned above to produce a pulse simultaneously as each stage of the readout register 25 is interrogated. This is performed by having the sampling register 25 and the zero modulator 55 both being actuated by the same pulse forming circuit 29 in synchronism.

The one modulator 52 and the zero modulator 55 are connected in parallel so that in the absence of a one tone pulse being produced at the output, a zero tone pulse is produced at the output, whereby the output code is in the form of different tone frequency pulses for recording purposes, each different frequency representing a zero or a one in the binary code as is desired.

To prevent spurious output signals from being produced, both the binary one modulator 52 and the binary zero modulator 55 are jointly gated or actuated by a control signal over line 56 which is obtained from a selector switch 57 being connected to the pulse scaler 14, thereby to be actuated in synchronism with the read out of the time code. Thus, the control signal over line 56 enables the binary one modulator and the binary zero modulator to function only at the time that each zero signal or one signal is to be represented as a pulse and thereby prevents any spurious or undesired pulses from being produced over the output line 59.

FIG. 2 illustrates a preferred circuit for one stage of the sampling magnetic register 25 and the manner in which the stages of the sampling register successively interrogate the stages of the counters 16 to 21, inclusive. As shown, each stage of the sampling register is comprised of a saturable core 62 having an input winding 62*e*, an output winding 62*c*, a sampling winding 62*d* and a transfer winding 62*b*. Presupposing that the stage shown in FIG. 2 is the first stage of the sampling register, this first stage is also provided with a reset winding 62*a*. In operation a pulse being produced by the reset pulse circuit 39 is directed to the reset winding 62*a* to reverse the direction of saturation of the core 62. After the core 62 is set and the readout or sampling is to commence, the first pulse produced by the pulse switching unit 28 is directed to energize the transfer windings 62*b*. This pulse thereby reverses the direction of saturation of the first core 62 to generate an output pulse in winding 62*c* which is stored on a capacitor 63. Additionally, a voltage pulse is generated in sampling winding 62*d* which has one terminal thereof connected to the readout output line 26 and the other terminal thereof connected over a line, such as 25*a*, to sample one of the flip-flop stages of the clock counter mechanism. The potential on line 25*a* will be at a more positive potential or at a more negative potential depending upon whether that binary stage of the counter is in its zero or in its one condition. If that stage of the counter being sampled is in its zero condition, the line 25*a* is at a more negative potential and when an output pulse is produced over winding 62*d*, this pulse when added to the more negative potential of line 25*a* does not raise the potential on the output line 26 sufficiently to actuate the pulse forming circuit 50 as shown in FIG. 1, and therefore a zero output signal is produced over line 26 indicating that the counter stage being sampled is in its zero condition. On the other hand, if the counter stage being sampled is in its one condition, the voltage existing on line 25*a* is at a more positive potential and the generation of an output pulse in winding 62*d* is sufficient when added to the potential of line 25*a* to produce a binary one pulse over output line 26 leading to the pulse forming circuit 50. In this manner, when the transfer winding 62*b* is energized by the pulse switch unit 28 during readout, it effectively samples the potential on the line 25*a* leading to the counter stage to produce a pulse on line 26 whose amplitude represents a binary one or a binary zero.

The transfer pulse on winding 62*b* also clears the core 62 to its initial condition, whereby the next succeeding transfer pulse produced by the pulse switching unit 28 does not aagain reverse the direction of saturation of the core 62 and therefore does not effect the core 62. However, the output winding 62*c* of this first stage is connected to an input winding, such as 62*e*, on the next succeeding stage of the sampling register, and therefore after the first sampling stage has been actuated, a pulse is transferred from the capacitor 63 to the input winding 62*e* of the next succeeding core, thereby reversing the next succeeding core and conditioning this core for sampling operation. This transfer of the pulse energization from the first core 62 to the next succeeding core, is accomplished by the same pulse switching unit 28, which produces a pulse to differentiating circuit, generally indicated as 66, to thence actuate a switching unit 64 connected in the circuit of the input winding 62*e* of the next stage, thereby to permit the capacitor 63 from the first mentioned stage to discharge through the input winding 62*e* of the next succeeding stage and condition the core in the next stage for operation.

As is believed evident, the pulse being directed to the switch 64 leads the transfer pulse being directed to the transfer winding 62*b* of the next core since it is differentiated by circuit 66, whereby just prior to sampling by this second core, the second core is properly conditioned for operation.

Upon the next succeeding readout pulse then being produced by the pulse switching unit 28, the next succeeding core (not shown) is again reversed in the same manner as previously described to sample or detect the condition of the next succeeding stage of the clock counter over line 25*b*, thereby to produce a binary one signal pulse or a binary zero signal pulse over line 26 depending upon the condition of the second stage of the counter. The transfer windings 62*b*, on each of the cores of the sampling register are all interconnected in series so that each transfer pulse being provided by the pulse switching unit 28 simultaneously actuates or pulses all of the cores in the sampling register. However, only those cores that have been previously conditioned by an input pulse from the capacitor 63 of a previous stage are in condition to sample their related stages of the counter. Consequently, as the pulse switching unit 28 is successively operated, each of the stages of the sampling register 25 is successively actuated to interrogate its associated one of the counter stages in the manner described above.

Returning to FIG. 1, it will be noted that there is provided in the sampling register 25 additional stages other than those necessary for sampling and reading out the counter stages. These additional stages are provided for time delay or spacing between the reading out of the counters 16 to 21, inclusive, or for providing other functions as desired in a data processing system.

The remaining circuits as shown in the system of FIG. 1 are all considered well known to those skilled in the art and detailed circuitry for illustrating these circuits are not believed necessary for an understanding of the present invention. For example, tuning fork oscillators 10 operating at a frequency of about 1600 cycles per second are well known, as are pulse shaper circuits such as 12. Similarly transistor or tube flip-flop circuits for both the counter and pulse divider stages are known as are circuits for producing tone oscillations such as 51 and 54 for generating sinusoidal tone signals. The pulse former circuits 29, 39, 53, etc. employed throughout the circuit are preferably single stage transistor switching circuits operating in conjunction with a magnetic core to produce uniform volt-time impulses. Such circuits are also known to those skilled in the art and further elaboration is considered unnecessary.

Although but one specific time-of-day code generator system has been illustrated and described, it is believed evident that many changes may be made in the circuits without departing from the spirit and scope of the invention. For example, different frequencies may be selected for the tuning fork oscillator 10 in which case a different pulse scaler-circuit having a greater or lesser number of stages would be employed, depending on the rate of clock readout and the like. Additionally, the circuitry may be varied to count the time-of-day in intervals of greater or less than one second depending upon the degree of accuracy desired or the time-of-day code being produced. Similarly, the clock mechanism may be operated and read out in other than the binary system by appropriately changing the counter stages 16 to 21, inclusive, to a different radix system. Since these and many other changes may be made by those skilled in the art, this invention should be considered as being limited only by the following claims appended hereto.

What is claimed is:

1. A time code generator for producing a different serial code of pulses for each different time-of-day representing the time of day at least in hours, minutes, and seconds in the binary number system comprising:
- a constant frequency oscillator mechanism producing oscillations at different submultiple frequencies,
- a multistage pulse counter energized by said oscillator at one frequency and having a number of binary stages to provide a count of the time-of-day in seconds, minutes, and hours in the binary number system,
- a readout register having a number of stages, including at least one stage for each stage of the counter, with the stages of said readout register being interconnected for sequential operation therebetween,
- each stage of the readout register stages associated with a counter stage being connected to sample the binary one or binary zero condition of that counter stage and the output lines from all of said register stages being connected in common,
- actuating means responsive to a different higher frequency of oscillation from said oscillator mechanism for cycling said readout register stages at a preselected rate capable of completely cycling all stages of said readout register in sequence within a time interval between successive counts of said pulse counter,
- whereby said register produces a series of output pulses representing the time-of-day in the binary number system during each of the successive counts of the counter.

2. In the time code generator of claim 1, a tone signal generator a modulator responsive to the serial pulse output of the readout register, said modulator being energized by said tone signal generator to produce said serial pulse output in the form of tone modulated pulses.

3. In the time code generator of claim 2, a second tone signal generator operating at a different frequency than said tone generator, a second modulator being energized by said oscillator mechanism at the frequency of cycling said readout register,
- said second modulator being additionally energized by said second tone signal generator to produce different tone modulated impulses,
- said first and second modulators being connected in such manner that said time-of-day code pulses are produced in the form of tone modulated pulses at the frequency of said tone generator and in the absence of a pulse in any position of the time-of-day code, a different tone modulated pulse is produced.

4. In the time code generator of claim 1, the addition of adjustable means for periodically initiating said actuating means at preset intervals thereby to commence readout of the time-of-day code at the beginning of each said preset interval, said adjusting means being independent of the preselected rate of cycling the stages of said readout register.

5. In the time code generator of claim 1, said oscillator means comprising a constant frequency tuning fork oscillator and a multistage pulse scaler having output terminals at different stages thereof to produce said different submultiple frequencies.

6. A time-of-day pulse code generator comprising, a constant frequency oscillator,
- a multistage pulse scaler energized by said oscillator and having output terminals at different stages thereof to produce a plurality of output frequencies at different submultiples of each other,
- a multistage pulse counter comprising a series of cascaded binary stages having a sufficient number of stages to count the time-of-day in the smallest and largest time intervals desired,
- said counter being energized by said pulse scaler to count at a frequency corresponding to the smallest increment of time to be determined,
- a readout register having a number of stages, including at least one stage for each stage of the counter,
- the stages of said register being interconnected in cascade for sequential operation, and with a different register stage being associated with each different counter stage to sample the count condition of that counter stage, the storage register stages being connected to a common output line,
- means responsive to a higher frequency submultiple output frequency from said pulse scaler for cycling said readout register stages for successive operation during a time interval that is less than the smallest increment of time to be counted by said counter,
- and a presettable means for said readout register for presetting the repetition rate of reading out the time-of-day stored in said counter,
- said presettable means being independent of the cycling rate of said readout register.

7. In the time-of-day pulse generator of claim 6, said cycling means being adjustable to vary the rate of cycling said readout register stages,
- and said presettable means for the readout register being independent of said adjustable means,
- whereby the repetition rate of reading out the time-of-day and the frequency of the read out pulses are independent of one another and changeable with respect to one another.

8. A time-of-day pulse code generator comprising:
- an oscillator means having a plurality of outputs for producing different frequency pulse trains,
- a multistage counter for summing one train of pulses from said oscillator means to count time-of-day,
- and a cyclically operating multistage readout register for successively reading out each stage of said counter to produce an output pulse code in serial form corresponding to the time-of-day,
- adjustable means for actuating said readout register to control the rate of successively reading out the counter stages during each cycle,
- and presettable means for actuating said readout register to control the time interval between succeeding readout cycles, said adjustable means and said presettable means being independent of one another whereby the repetition rate of reading out the time-of-day code may be varied independently of the frequency of pulses in the readout code and the reverse.

9. In the generator of claim 8, a first tone generator, a second tone generator operating at a different frequency than the first tone generator, and output means energized by said first and second tone generators, by said oscillator means and by said pulse code to reproduce the pulse code in the form of different tone modulated impulses.

10. In the generator of claim 8, said adjustable means including a selector switch means for selecting different frequency pulse trains from said oscillator and energizing said register thereby.

11. In the generator of claim 8, said presettable means including a selector switch for selecting different frequency pulse trains from said oscillator means and reset means for the register for repetitively resetting the register to commence its cycle of operations at different rates.

12. In the generator of claim 8, the addition of error preventing means for preventing the generation of spurious impulses during the production of the pulse code, said error preventing means including a gate circuit responsive to said pulse code and pulsing means for energizing said gate circuit in synchronism with the readout of each stage of the counter.

13. A time-of-day pulse code generator comprising:

an oscillator means producing different frequency output trains of pulses, a multistage counter for summing one of said train of pulses for counting time-of-day, cyclically operating readout means for successively sampling each stage of the counter during each cycle thereof and producing a pulse if that stage possesses a count, presettable means for controlling the rate of cycling said readout means, and adjustable means for controlling the frequency of successively sampling the counter stages during each cycle of said readout means.

14. In the generator of claim 13, said presettable means and said adjustable means each being independently variable.

15. A time-of-day pulse code generator comprising:

a pulse oscillator means producing a series of different frequency pulse trains, a multistage counter for counting the pulses from one of said trains to count time-of-day, a cyclically operating multistage readout register for successively sampling each stage of the counter during each cycle of operation thereof to produce a series of pulses in a code corresponding to the count accumulated in the counter, presettable control means for cycling said register at a predetermined rate, said presettable control means including a first selector switch for selecting different ones of the pulse trains from the pulse oscillator means, adjustable means for controlling the rate of sampling of the counter stages by the register, said adjustable means including a second selector switch for selecting different ones of the pulse trains from the counter, said first and second selector switches being independently variable to change the rate of readout of time-of-day pulse code and the frequency of pulses in the code respectively, output means for preventing the generation of spurious impulses during the production of the pulse code, said output means comprising a plurality of tone generators, and modulator means energized by said tone generators and by said pulse code for producing a given tone impulse for each pulse in the code and a different tone impulse in the absence of a pulse in the code.

References Cited by the Examiner

UNITED STATES PATENTS

| | | | |
|---|---|---|---|
| 2,410,156 | 10/1946 | Flory | 58—26 |
| 2,560,124 | 7/1951 | Mofenson | 332—11 |
| 2,849,704 | 8/1958 | Neff | 340—174 |
| 3,010,094 | 11/1961 | MacArthur | 340—172.5 |

ROBERT C. BAILEY, *Primary Examiner.*

MALCOLM A. MORRISON, *Examiner.*

R. M. RICKERT, *Assistant Examiner.*